United States Patent
Kojima (10) Patent No.: US 10,498,261 B2
(45) Date of Patent: Dec. 3, 2019

(54) VIBRATION-TYPE ACTUATOR THAT MOVES VIBRATING BODY AND DRIVEN BODY RELATIVELY TO EACH OTHER, AND ELECTRONIC APPARATUS

(71) Applicant: CANON KABUSHIKI KAISHA, Tokyo (JP)

(72) Inventor: Nobuyuki Kojima, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 195 days.

(21) Appl. No.: 15/389,750

(22) Filed: Dec. 23, 2016

(65) Prior Publication Data
US 2017/0207725 A1    Jul. 20, 2017

(30) Foreign Application Priority Data
Jan. 14, 2016 (JP) .................................. 2016-005289

(51) Int. Cl.
*H02N 2/02* (2006.01)
(52) U.S. Cl.
CPC .................................. *H02N 2/026* (2013.01)
(58) Field of Classification Search
CPC ......... H02N 2/026; H02N 2/001; H02N 2/004
See application file for complete search history.

(56) References Cited

U.S. PATENT DOCUMENTS

| 7,518,286 | B2 | 4/2009 | Kojima et al. |
| 7,583,008 | B2 | 9/2009 | Kojima et al. |
| 8,643,252 | B2 | 2/2014 | Oda et al. |
| 8,760,036 | B2 | 6/2014 | Kojima |
| 2007/0069609 | A1* | 3/2007 | Kojima ................ H02N 2/0015 310/323.01 |
| 2011/0278987 | A1* | 11/2011 | Oda ..................... H02N 2/0015 310/323.16 |
| 2014/0125200 | A1 | 5/2014 | Oda et al. |

FOREIGN PATENT DOCUMENTS

| JP | 4072518 B2 | 4/2008 |
| JP | 4881064 B2 | 2/2012 |
| JP | 5349768 B2 | 11/2013 |

\* cited by examiner

*Primary Examiner* — Derek J Rosenau
(74) *Attorney, Agent, or Firm* — Venable LLP

(57) ABSTRACT

A vibration-type actuator can downsizes a pressing mechanism for bringing a vibrating body and a driven body into press contact with each other and generates required pressing force. The vibrating body has an elastic body, an electro-mechanical energy conversion element, and at least one projecting portion. The driven body has a driven base material that is brought into press contact with the vibrating body, and a permanent magnet joined to the driven base material. The driven base material and the elastic body face each other across the permanent magnet in a thickness direction of the elastic body. The permanent magnet is magnetized in the thickness direction of the elastic body. A magnetic action of the permanent magnet on the elastic body and the driven base material brings the projecting portion and the driven base material into press contact with each other in the thickness direction of the elastic body.

24 Claims, 10 Drawing Sheets

VIBRATION-TYPE ACTUATOR THAT MOVES VIBRATING BODY AND DRIVEN BODY RELATIVELY TO EACH OTHER, AND ELECTRONIC APPARATUS

BACKGROUND OF THE INVENTION

Field of the Invention

The present invention relates to a vibration-type actuator that brings a vibrating body and a driven body into pressure contact with each other and moves the vibrating body and the driven body relatively to each other through driving vibrations excited in the vibrating body, and an electronic apparatus having the vibration-type actuator.

Description of the Related Art

There are known a variety of vibration-type actuators which bring a driven body into pressure contact with a vibrating body, which is constructed by joining an electro-mechanical energy conversion element such as a piezoelectric element to an elastic body together, and move the vibrating body and the driven body relatively to each other through driving vibrations excited in the vibrating body. For such vibration-type actuators, a method that brings the vibrating body and the driven body into pressure contact with each other using magnetic force is known. For example, an arrangement in which a permanent magnet is provided in at least a part of the driven body has been proposed (see Japanese Patent Publication No. 4072518 and Japanese Patent Publication No. 5349768). An arrangement in which a magnetic member is placed in a space between the vibrating body and the driven body has also been proposed (see Japanese Patent Publication No. 4881064). Specifically, a projecting portion which comes into contact with the driven body is provided on a first surface of the vibrating body, and a permanent magnet is placed between the first surface and the driven body so that the driven body can be attracted toward the vibrating body by magnetic force. A pressurizing mechanism using such a permanent magnet is more advantageous than a pressurizing mechanism using a spring because of a simplified structure.

Figure 11A:
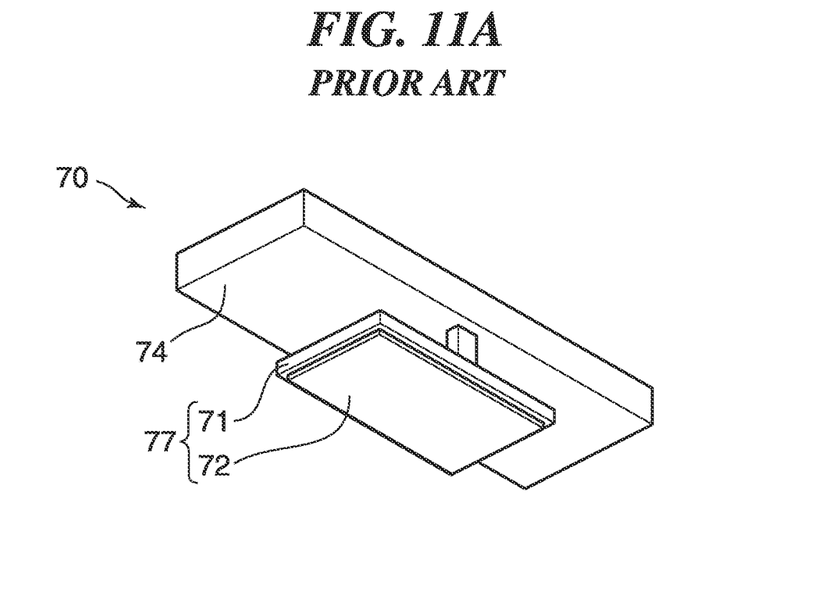
FIG. 11A is a perspective view schematically showing an arrangement of a vibration-type actuator having a pressurizing mechanism according to a prior art.

FIG. 11A is a perspective view schematically showing an arrangement of a vibration-type actuator 70 with a pressurizing mechanism according to a prior art. The vibration-type actuator 70 has a vibrating body 77 constructed by forming a piezoelectric element 72 integrally with an elastic body 71, which is made of a ferromagnetic material, using an adhesive agent, and a permanent magnet 74. The permanent magnet 74 is in pressure contact with a part of the elastic body 71, and driving vibrations excited in the vibrating body 77 move the permanent magnet 74 and the vibrating body 77 relatively to each other.

Figure 11B:
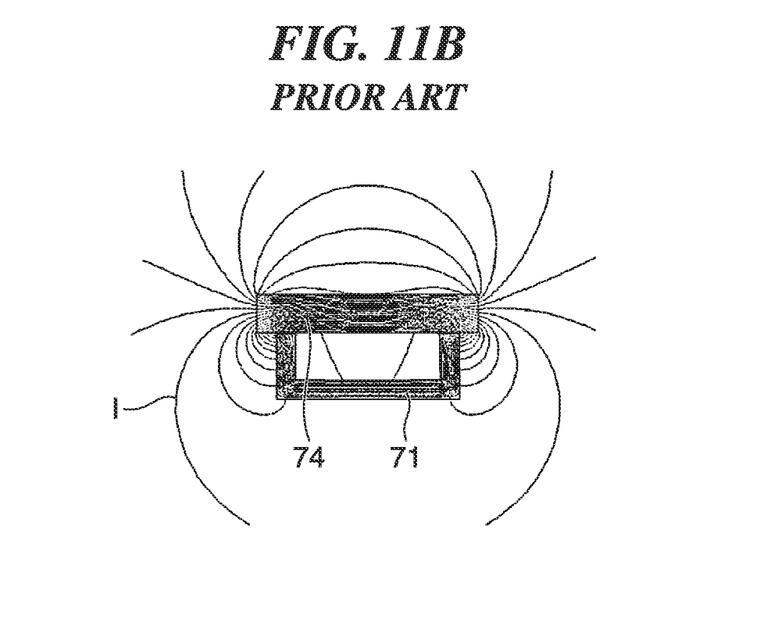
FIG. 11B is a cross-sectional view showing a magnetic circuit formed by a permanent magnet in the vibration-type actuator in FIG. 11A.

FIG. 11B is a cross-sectional view showing a state in which the permanent magnet 74 and the vibrating body 77 are in pressure contact with each other. It should be noted that in FIG. 11B, the cross-section of the permanent magnet 74 has a substantially rectangular shape, and the elastic body 71 and the permanent magnet 74 move relatively to each other in a direction perpendicular to the sheet of the figure. The permanent magnet 74 is magnetized in a horizontal direction as viewed in FIG. 11B, and a magnetic action of the permanent magnet 74 and the elastic body 71 is indicated by magnetic lines of force I in FIG. 11B. An attracting action resulting from the magnetic lines of force I passing through the permanent magnet 74 and the elastic body 71 generates a pressurizing force on the elastic body 71 and the permanent magnet 74.

A variety of apparatuses equipped with a vibration-type actuator are always required to be downsized and implement high-density packing, and a pressuring mechanism of a vibration-type actuator as well is required to be further downsized. An output from a vibration-type actuator, in particular, generative force (torque) from a vibration-type actuator depends on frictional force generated between a vibrating body and a driven body, and therefore, in order to obtain required generative force, a pressurizing mechanism capable of generating desired pressurizing force is needed between a vibrating body and a driven body. For example, in the vibration-type actuator 70 in FIGS. 11A and 11B, a significant amount of magnetic lines of force I does not pass through the elastic body 70. In particular, since no arrangement that guides the magnetic lines of force I is provided on an upper side of the permanent magnet 74, many magnetic lines of force I do not pass through the elastic body 71, and hence magnetic force of the permanent magnet 74 cannot be effectively used. For this reason, to obtain required pressurizing force, there is a limitation on the extent to which the size or the like of the permanent magnet 74 is reduced, and it is thus uneasy to downsize the pressurizing mechanism.

SUMMARY OF THE INVENTION

The present invention provides a vibration-type actuator and an electronic apparatus which are able to downsize a pressurizing mechanism for bringing a vibrating body and a driven body into pressure contact with each other and generate required pressurizing force.

Accordingly, the present invention provides a vibration-type actuator that brings a vibrating body and a driven body into pressure contact with each other and relatively moves the vibrating body and the driven body through driving vibrations excited in the vibrating body, wherein the vibrating body comprises a flat-shaped elastic body that is made of a ferromagnetic material, an electro-mechanical energy conversion element that is joined to one surface of the elastic body, and at least one projecting portion that is provided on a surface opposite to the surface of the elastic body to which the electro-mechanical energy conversion element is joined, wherein the driven body comprises a driven base material that is made of a ferromagnetic material and is brought into pressure contact with the vibrating body at an end of the projecting portion, and a permanent magnet that is joined to the driven base material, wherein the driven base material and the elastic body are placed so as to face each other across the permanent magnet in a thickness direction of the elastic body, wherein the permanent magnet is magnetized in the thickness direction of the elastic body, and wherein a magnetic action of the permanent magnet on the elastic body and the driven base material brings the projecting portion and the driven base material into pressure contact with each other in the thickness direction of the elastic body.

According to the present invention, a pressurizing mechanism for bringing the vibrating body and the driven body into pressure contact with each other is downsized, making the vibration-type actuator smaller in size. Moreover, according to the present invention, required pressurizing force is easily generated between the vibrating body and the driven body, and as a result, the vibration-type actuator has desired generative force.

Further features of the present invention will become apparent from the following description of exemplary embodiments (with reference to the attached drawings).

DESCRIPTION OF THE EMBODIMENTS

Hereafter, embodiments of the present invention will be described in detail with reference to the drawings.

Figure 1A:
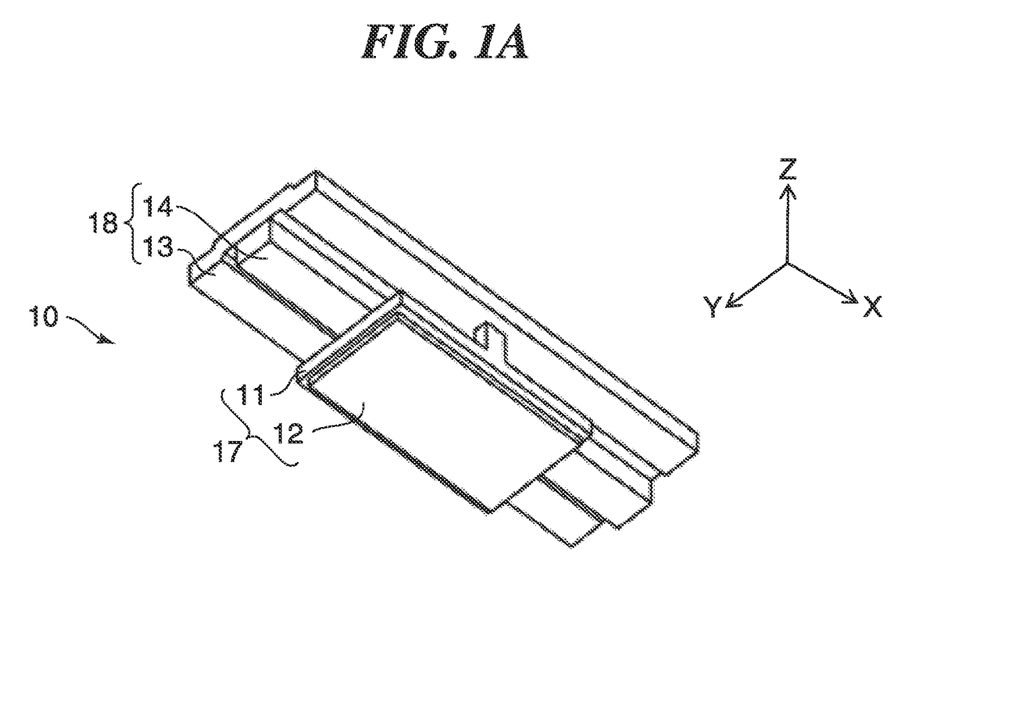
FIG. 1A is a perspective view schematically showing an arrangement of a vibration-type actuator according to a first embodiment of the present invention.

A description will now be given of a first embodiment of the present invention. FIG. 1A is a perspective view schematically showing an arrangement of a vibration-type actuator 10 according to the first embodiment of the present invention. The vibration-type actuator 10 has a vibrating body 17 and a driven body 18. The vibrating body 17 has an elastic body 11 and a piezoelectric element 12, and the driven body 18 has a driven base material 13 and a permanent magnet 14. It should be noted that for the convenience of explanation, an X direction, a Y direction, and a Z direction perpendicular to one another are defined as shown in FIG. 1A. As will be described later, the X direction is a direction in which the vibrating body 17 and the driven body 18 move relatively to each other and is a longitudinal direction of the elastic body 11. The Z direction is a pressurizing direction in which the vibrating body 17 and the driven body 18 are brought into pressure contact with each other and is a thickness direction of the elastic body 11. The Y direction is a direction perpendicular to both the X direction and the Z direction and is a lateral direction of the elastic body 11.

The driven body 18 is constructed by joining the permanent magnet 14, which is a rectangular parallelepiped neodymium magnet, and the driven base material 13, which is made of a ferromagnetic material, to each other using an adhesive agent or the like. A part of the driven base material 13 (a sliding portion 13b described later with reference to FIG. 3) is brought into pressure contact with the vibrating body (projecting portions 11b described later with reference to FIG. 1B) and frictionally driven by the projecting portion 11b. Accordingly, a frictional sliding surface of the driven base material 13 needs to have abrasion resistance, and hence the driven base material 13 is formed by thermally treating a martensite stainless material. It should be noted that this is not limitative, but the driven base material 13 may have a frictional sliding surface thereof with abrasion resistance increased by, for example, plating or nitriding a surface of electromagnetic soft iron. Namely, the driven base material 13 has only to have a portion made of a ferromagnetic material and also have a frictional sliding surface with abrasion resistance. Therefore, the driven base material 13 may have a structure in which a material with excellent abrasion resistance is joined to a base material made of a ferromagnetic material so as to serve as a frictional sliding surface.

Figure 1B:
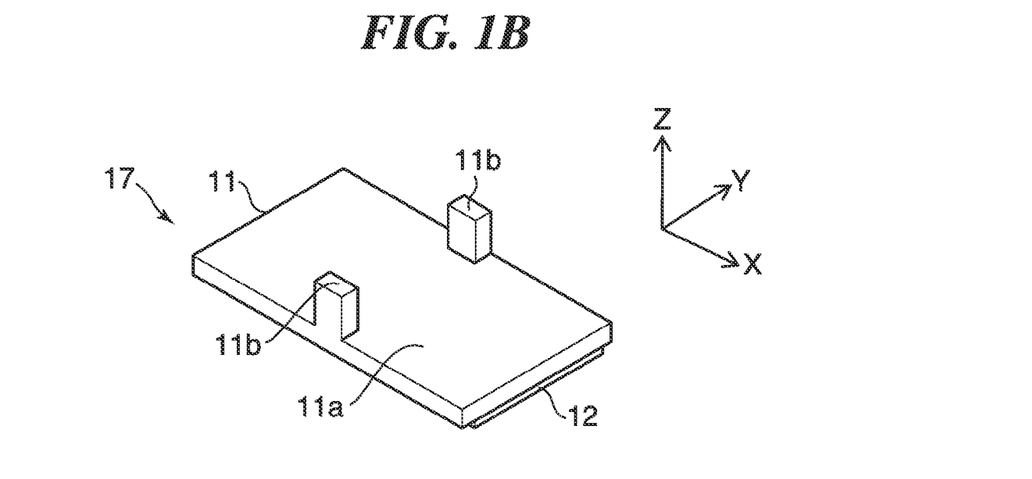
FIG. 1B is a perspective view schematically showing a vibrating body constituting the vibration-type actuator in FIG. 1A.

FIG. 1B is a perspective view schematically showing an arrangement of the vibrating body 17. The piezoelectric element 12, which is an electro-mechanical energy conversion element, is constructed by forming predetermined electrodes on respective surfaces of a substantially rectangular flat-shaped piezoelectric ceramics and polarizing the piezoelectric ceramics in the direction of the thickness using the electrodes. The elastic body 11 has a flat-shaped portion 11a, which is made of a ferromagnetic material and substantially rectangular flat-shaped, and a pair of projecting portions 11b which project in the Z direction (the thickness direction of the flat-shaped portion 11a) from the flat-shaped portion 11a in substantially a central part of the flat-shaped portion 11a in the longitudinal direction thereof and at ends of the flat-shaped portion 11a in the Y direction. As with the driven base material 13, the elastic body 11 has only to have a portion made of a ferromagnetic material and also have frictional sliding surfaces (end faces of the projecting portions 11b) with increased abrasion resistance. Accordingly, the elastic body 11 is fabricated by, for example, thermally treating a martensite stainless material. The piezoelectric element 12 is joined to a surface of the flat-shaped portion 11a of the elastic body 11, which is opposite to the surface on which the projecting portions 11b are formed, using an adhesive agent or the like. The vibrating body 17 is placed such that the projecting portions 11b face the driven body 18, and the driven body 18 is placed such that the permanent magnet 14 faces the vibrating body 17.

Figure 2A:
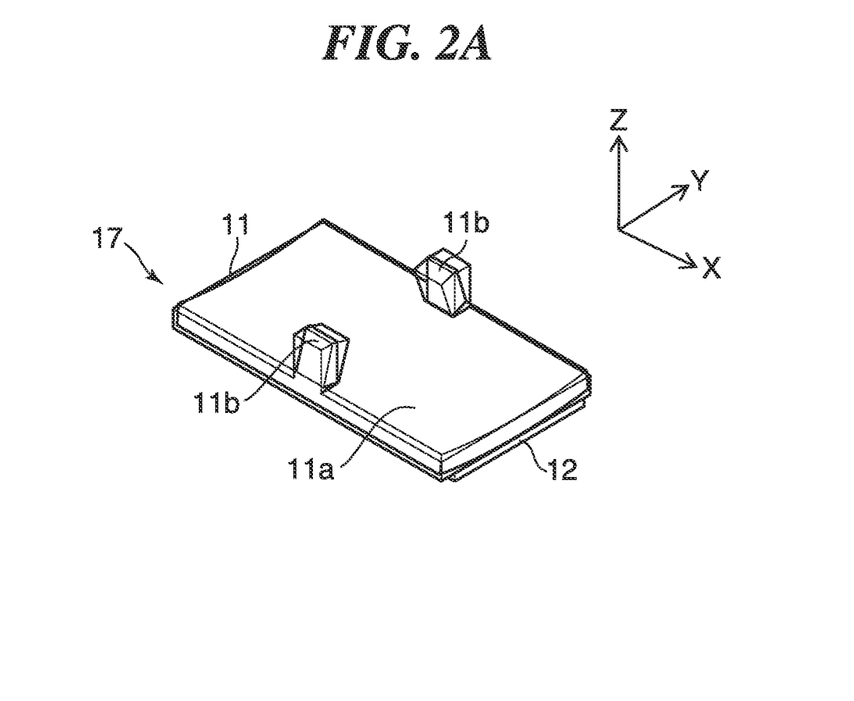
FIGS. 2A and 2B are views showing in schematic form how the vibrating body of the vibration-type actuator in FIGS. 1A and 1B is deformed in respective vibration modes, FIG. 2A showing a first vibration mode, and FIG. 2B showing a second vibration mode.
Figure 2B:
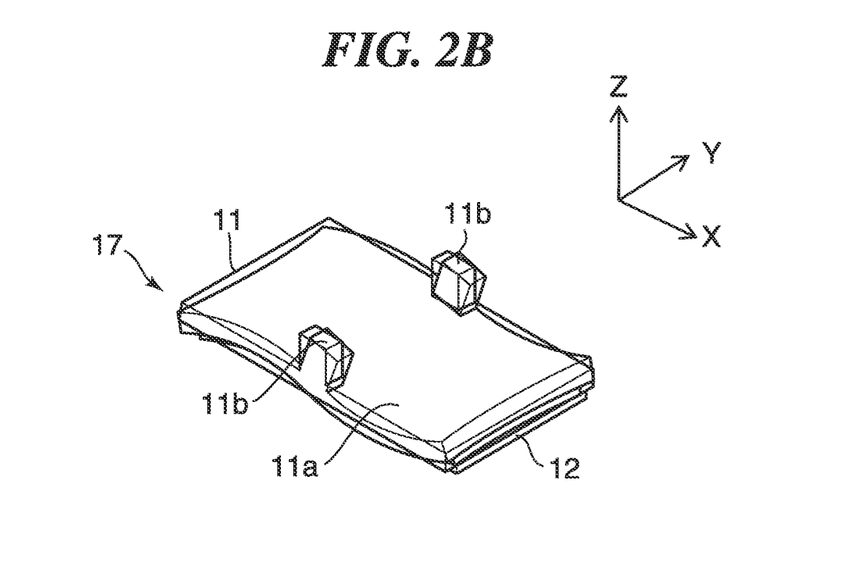

FIG. 2A is a view schematically showing in schematic form how the vibrating body 17 is deformed by vibration in a first vibration mode (hereafter referred to as "the mode A") that is used to drive the vibration-type actuator 10. FIG. 2B is a view schematically showing in schematic form how the vibrating body 17 is deformed by vibration in a second vibration mode (hereafter referred to as "the mode B") that is used to drive the vibration-type actuator 10.

Driving vibrations for driving the vibration-type actuator 10 are generated by combining a vibration in the mode A and a vibration in the mode B. Namely, a vibration in the mode A generates a vibration component that causes a reciprocating motion in the Z direction (the thickness direction of the elastic body 11) in the pair of projecting portions 11b. A vibration in the mode B generates a vibration component that causes a reciprocating motion in the X direction in the pair of projecting portions 11b. It should be noted that as described earlier, the X direction is a direction perpendicular to both the Y direction (the direction that connects the pair of projecting portions 11b together) and the Z direction. Thus, by generating vibration components in the respective modes A and B such that a temporal phase difference arises, an oval motion within a substantial X-Z plane is produced in the pair of projecting portions 11b. The oval motion thus produced in the pair of projecting portions 11b causes frictional driving force (thrust) to be applied from the pair of projecting portions 11b to the driven body 18 being in pressure contact with the pair of projecting portions 11b, enabling the vibrating body 17 and the driven body 18 to move relatively to each other in the X direction.

Figure 3:
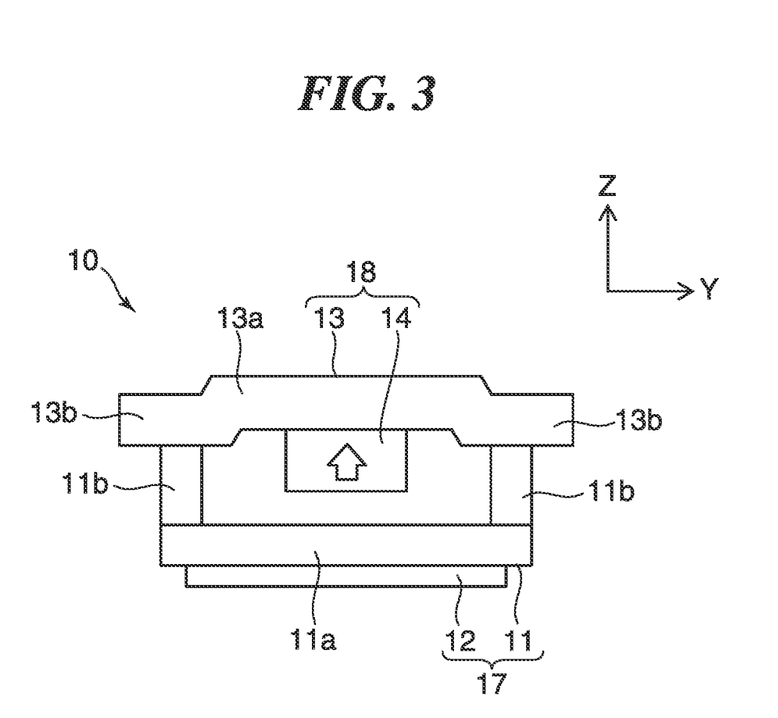
FIG. 3 is a side view showing the vibration-type actuator in FIGS. 1A and 1B.

FIG. 3 is a side view showing the vibration-type actuator 10 (as seen in the X direction). The driven base material 13 constituting the driven body 18 has a magnet joining portion 13a to which the permanent magnet 14 is joined, and a pair of sliding portions 13b that are formed integrally with the magnet joining portion 13a to sandwich the magnet joining portion 13a. As shown by an end-face shape in FIG. 3, the magnet joining portion 13a and the sliding portions 13b have a difference in level. In other words, the sliding portions 13b are extended in the Z direction from the magnet joining portion 13a. The width of the permanent magnet 14 in the Y direction is smaller than those of the vibrating body 17 and the driven base material 13, and the permanent magnet 14 is bonded to the magnet joining portion 13a in a central part of the driven base material 13 in the Y direction. The vibrating body 17 and the driven body 18 are placed such that the driven base material 13 and the elastic body 11 face each other in the Z direction across the permanent magnet 14, and the two sliding portions 13b and the two projecting portions 11b are in contact with each other.

The driven base material 13 is designed to have such a shape that the pair of sliding portions 13b is closer to the vibrating body 17 than the magnet joining portion 13a when the vibrating body 17 and the driven body 18 are brought into pressure contact with each other. The permanent magnet 14 is placed midway between the two projecting portions 11b in the Y direction. Here, the permanent magnet 14 is magnetized in substantially the Z direction. Thus, a magnetic action of the permanent magnet 14 pulls the vibrating body 17 and the driven body 18 toward each other, and as a result, pressuring or pressing forces are generated between the vibrating body 17 and the driven body 18 in substantially the Z direction. At this time, the vibration-type actuator 10 has a shape that is substantially symmetric in the Y direction. Therefore, the pressurizing forces generated between the vibrating body 17 and the driven body 18 are substantially the same at the two projecting portions 11b, and hence the projecting portions 11b apply frictional driving force of the same magnitude to the driven body 18. As a result, the resultant of frictional driving forces applied to the driven body 18 by the two projecting portions 11b is efficiently generated in the X direction, and hence the driving efficiency of the vibration-type actuator 10 is increased.

Figure 4A:
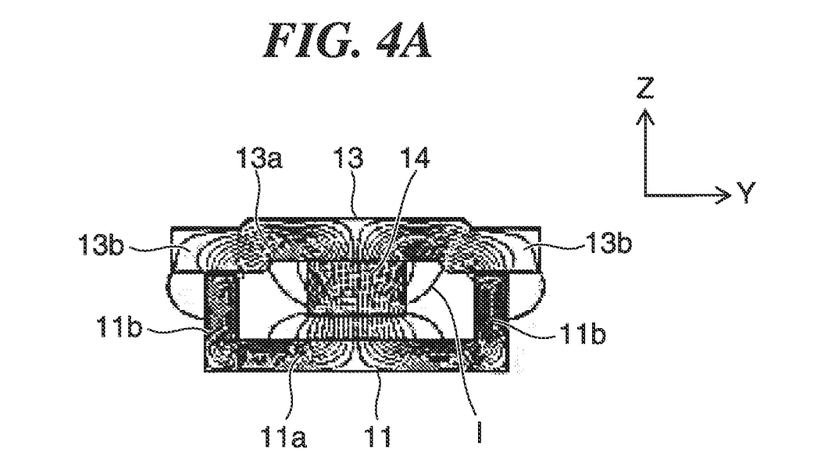
FIGS. 4A and 4B are cross-sectional views useful in explaining a magnetic circuit formed by a permanent magnet in the vibration-type actuator in FIGS. 1A and 1B.
Figure 4B:
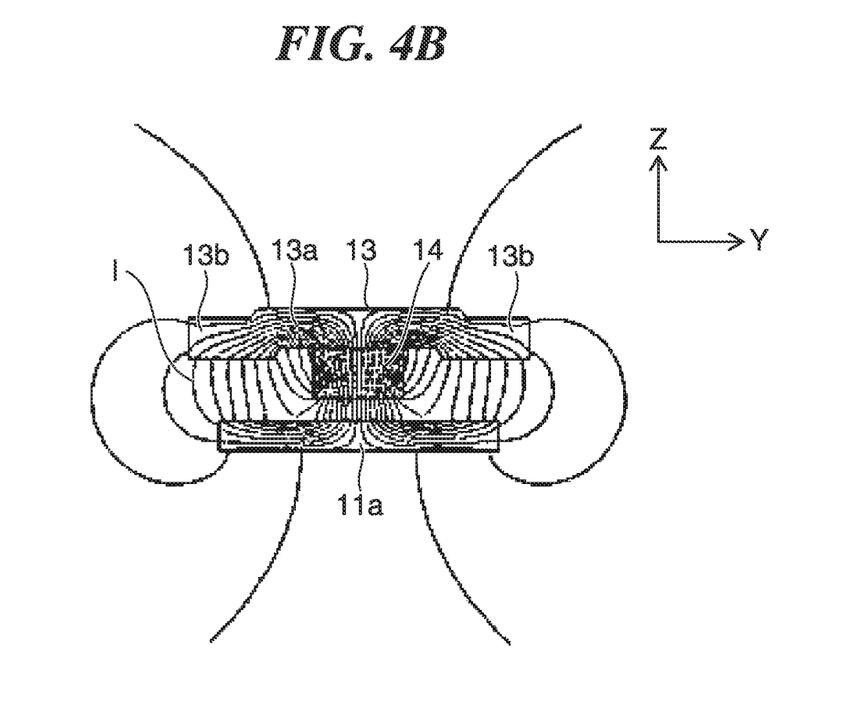

FIGS. 4A and 4B are cross-sectional views (YZ cross-sectional views) useful in explaining a magnetic circuit formed by the permanent magnet 14 in the vibration-type actuator 10. FIG. 4A shows a cross-section that includes the projecting portions 11b, and FIG. 4B shows a cross-section that does not include the projecting portions 11b. In each of FIGS. 4A and 4B, magnetic lines of force I generated in the vibrating body 17 and the driven body 18 and the surrounding space are shown in schematic form.

As shown in FIG. 4A, in an area including the projecting portions 11b, the magnetic lines of force I begin on a top surface of the permanent magnet 14 to pass through the driven base material 13 abutting against an upper side of the permanent magnet 14. The magnetic lines of force I extend from the driven base material 13 to pass through the projecting portions 11b of the elastic body 11, which abut against the sliding portions 13b, and the flat-shaped portion 11a located below the permanent magnet 14, and go back to an underside of the permanent magnet 14 through the air. The action of the magnetic lines of force I generated inside the elastic body 11 by the permanent magnet 14 attracts the elastic body 11 toward the permanent magnet 14 and the driven base material 13. Almost all of the magnetic lines of force I generated by the permanent magnet 14 pass through the driven base material 13 and the elastic body 11, and hence magnetic force of the permanent magnet 14 is efficiently used for attraction.

Moreover, as shown in FIG. 4B, in an area that does not include the projecting portions 11b but includes only the flat-shaped portion 11a, the magnetic lines of force I begin on a top surface of the permanent magnet 14 to pass through the driven base material 13 abutting against an upper side of the permanent magnet 14. The magnetic lines of force I extend from the driven base material 13 to pass through the flat-shaped portion 11a located below the permanent magnet 14 through the air, and go back to an underside of the permanent magnet 14 through the air again. Therefore, as with FIG. 4A, the action of the magnetic lines of force I generated inside the elastic body 11 by the permanent magnet 14 attracts the elastic body 11 toward the permanent magnet 14 and the driven base material 13. By thus placing the driven base material 13 and the elastic body 11 such that they sandwich the permanent magnet 14, magnetic force of the permanent magnet 14 is efficiently used for attraction.

The attraction of the driven body 13 to the elastic body 11 by the permanent magnet 14 causes a desired pressuring force to be generated between the sliding portions 13b and the projecting portions 11b being in contact with each other. At this time, a magnetic flux hardly leaks to a space around the vibrating body 17 and the driven body 18, and hence magnetic force of the permanent magnet 14 is caused to efficiently act as pressurizing force. This enables downsizing of the permanent magnet 14, resulting in weight reduction and cost reduction of the driven body 18.

Moreover, since the vibration-type actuator 10 has a shape that is symmetrical in the Y direction as described earlier, the magnetic lines of force I as well are generated symmetrically in the Y direction. This makes the magnitudes of pressurizing forces generated in two areas of contact between the sliding portions 13b and the projecting portions 11b equal, and therefore, makes the magnitudes of frictional driving force applied to the driven body 18 by the projecting portions 11b equal. As described above, the vibration-type actuator 10 makes the downsizing possible and obtains desired generative force by generating desired pressurizing force even with its simplified arrangement.

Figure 5:
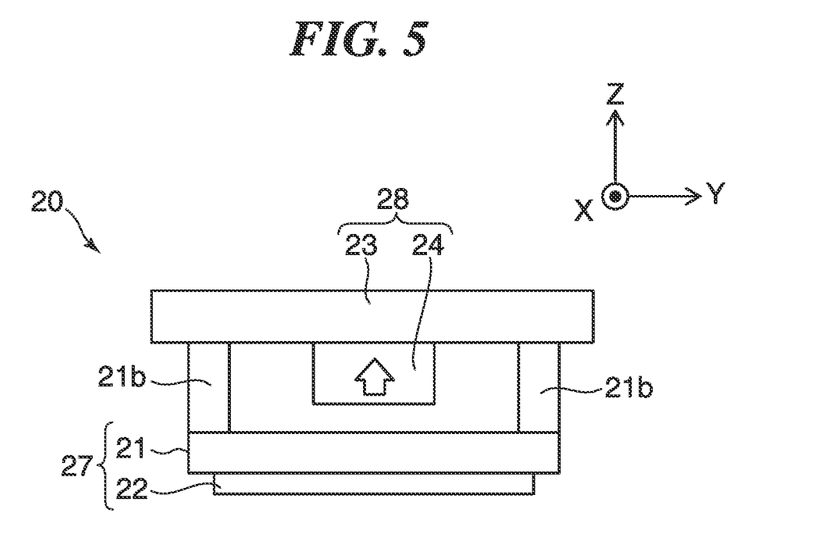
FIG. 5 is a side view schematically showing an arrangement of a vibration-type actuator according to a second embodiment of the present invention.

Next, a description will be given of a second embodiment of the present invention. FIG. 5 is a cross-sectional view schematically showing an arrangement of a vibration-type actuator 20 according to the second embodiment of the present invention. The vibration-type actuator 20 has a vibrating body 27 and a driven body 28. The vibrating body 27 has an elastic body 21 and a piezoelectric element 22, and the elastic body 21 has projecting portions 21b. The vibrating body 27 is the same as the vibrating body 17 of the first embodiment described above (the elastic body 21 and the piezoelectric element 22 are the same as the elastic body 11 and the piezoelectric element 12, respectively), and hence description thereof is omitted here. The driven body 28 has a driven base material 23 and a permanent magnet 24. The permanent magnet 24 is the same as the permanent magnet 14 of the first embodiment described above.

The driven base material 23 differs from the driven base material 13 of the first embodiment described above in that a side shape of the driven base material 23 is a simple rectangle. It should be noted that magnetic characteristics and mechanical characteristics required for the elastic body 21 and the driven base material 23 are the same as those required for the elastic body 11 and the driven base material 13 of the first embodiment described above, and hence description thereof is omitted here. The arrangement of the vibration-type actuator 20 may be adopted when the height of the projecting portions 21b is greater than the thickness of the permanent magnet 24 in the Z direction, and the vibrating body 27 and the driven body 28 relatively move without any troubles (the vibrating body 27 and the driven body 28 are not unnecessarily brought into contact with each other). It goes without saying that the effects obtained by the vibration-type actuator 10 are obtained by the vibration-type actuator 20 as well.

Next, a description will be given of a third embodiment of the present invention. Specifications of vibration-type actuators are customized according to purposes of use. For example, when high-speed driving performance is not required for the vibration-type actuator 10 of the first embodiment described above, but great generative force is required for the vibration-type actuator 10 of the first embodiment described above, pressurizing force between the vibrating body 17 and the driven body 18 needs to be increased. In an exemplary way to increase pressurizing force, the space between the flat-shaped portion 11a of the elastic body 11 and the sliding portions 13b of the driven base material 13 is narrowed.

Figure 6:
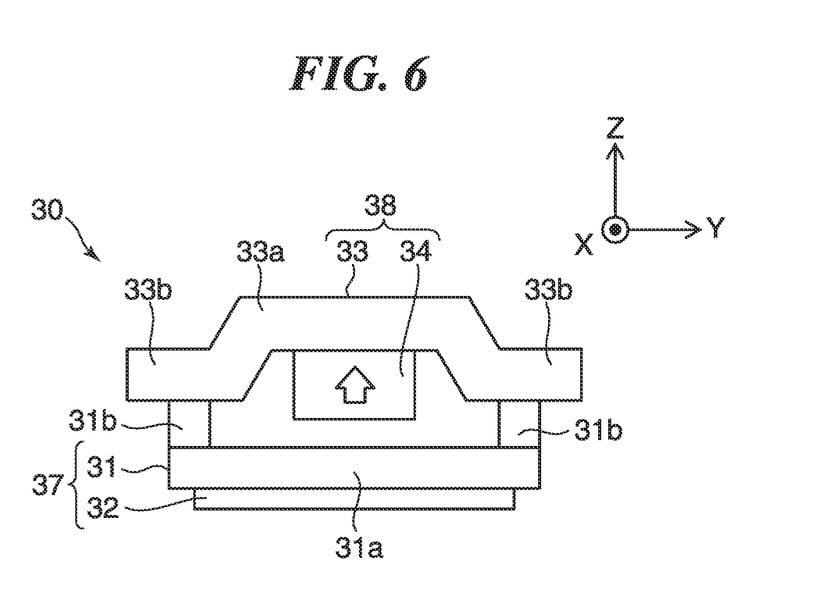
FIG. 6 is a side view schematically showing an arrangement of a vibration-type actuator according to a third embodiment of the present invention.

FIG. 6 is a side view schematically showing an arrangement of a vibration-type actuator 30 according to the third embodiment of the present invention. The vibration-type actuator 30 has a vibrating body 37 and a driven body 38. The vibrating body 37 has an elastic body 31 and a piezoelectric element 32. The driven member 38 has a driven base material 33 and a permanent magnet 34. The piezoelectric element 32 and the permanent magnet 34 are the same as the piezoelectric element 12 and the permanent magnet 14 of the first embodiment described above, and hence description thereof is omitted here. Magnetic characteristics and mechanical characteristics required for the elastic body 31 and the driven base material 33 are the same as those required for the elastic body 11 and the driven base material 13 of the first embodiment described above, and hence description thereof is omitted here.

The elastic body 31 has a flat-shaped portion 31a, which is substantially rectangular flat-shaped, and a pair of projecting portions 31b which are provided at ends of the flat-shaped portion 31a in the Y direction. The flat-shaped portion 31a is the same as the flat-shaped portion 11a of the first embodiment described above, and the pair of projecting portions 31b differs from the pair of projecting portions 11b of the first embodiment described above in that the pair of projecting portions 31b projects over a shorter length (smaller in height in the Z direction) than the pair of projecting portions 11b. This is because when high-speed driving performance is not required, vibration displacements to be generated in the projecting portions 31b may be small. Moreover, the driven base material 33 differs from the driven base material 13 of the first embodiment described above in that there is a greater difference in level between a magnet joining portion 33a and sliding portions 33b in the Z direction. Providing the driven base material 33 with such a difference in level in the Z direction enables the placement of the permanent magnet 34 and also makes the sliding portions 33b closer to the flat-shaped portion 31a of the elastic body 31. By thus narrowing the space between the flat-shaped portion 31a and the sliding portions 33b, attracting force generated between the flat-shaped portion 31a and the sliding portions 33b is increased due to magnetic force of the permanent magnet 34 to obtain great pressurizing force, and by extension great generative force.

Figure 7:
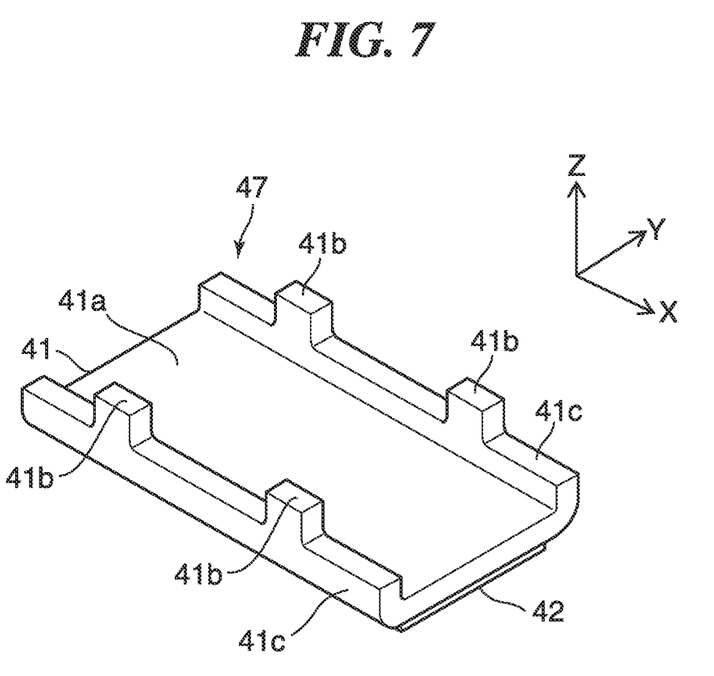
FIG. 7 is a perspective view schematically showing an arrangement of a vibrating body constituting a vibration-type actuator according to a fourth embodiment of the present invention.

Next, a description will be given of a fourth embodiment of the present invention. FIG. 7 is a perspective view schematically showing an arrangement of a vibrating body 47 constituting a vibration-type actuator according to the fourth embodiment of the present invention. The vibrating body 47 has an elastic body 41 and a piezoelectric element 42. The piezoelectric element 42 is the same as the piezoelectric element 12 of the first embodiment described above. The elastic body 41 has a flat-shaped portion 41a, a pair of side wall portions 41c which are formed along the X direction at ends in the Y direction of the flat-shaped portion 41a and project in the Z direction, and a pair of projecting portions 41b which project in the Z direction from upper end faces of the side wall portions 41c. The side wall portions 41c are designed to have such a height that they are not in contact with a driven body, not shown. Two projecting portions 41b are formed on each of the side wall portions 41c. Namely, two pairs of projecting portions 41b are formed on one pair of side wall portions 41c. Since there are four projecting portions 41b, the area of contact between the projecting portions 41b and the sliding portions 33b is increased to reduce wear that occurs when they are sliding in contact with each other. Moreover, since there are multiple pairs of projecting portions 41b, pressurizing force is increased as compared to the case where there is only one pair of projecting portions 41b. However, this does not exclude an arrangement in which a pair of projecting portions 41b is formed on a pair of side wall portions 41c.

In the third embodiment described above, by making the height of the projecting portions 31b smaller and having a large difference in level between the magnet joining portion 33a and the sliding portions 33b of the driven base material 33 in the Z direction, the space between the flat portion 31a of the elastic body 31 and the sliding portions 33b of the driven base material 33 is narrowed. On the other hand, using the vibrating body 47 and the driven member 28 of the second embodiment described above in combination enables the placement of the permanent magnet 24, and the side wall portions 41c narrow the space between the flat portion 41a and the driven base material 23. As a result, a vibration-type actuator that is able to generate satisfactory pressurizing force between the projecting portions 41b and the driven base material 23 is implemented.

Figure 8A:
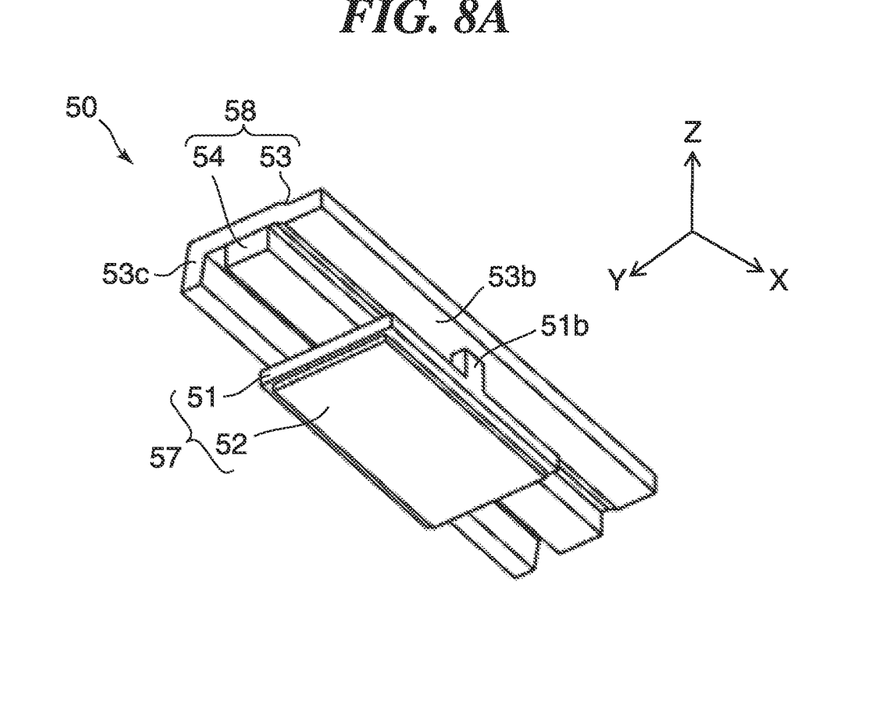
FIG. 8A is a perspective view schematically showing an arrangement of a vibration-type actuator according to a fifth embodiment of the present invention.
Figure 8B:
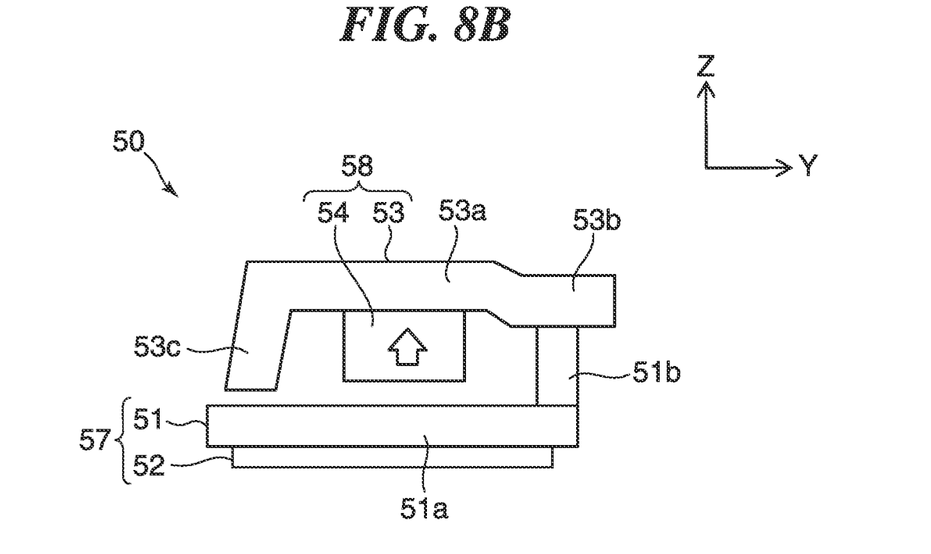
FIG. 8B is a side view showing the vibration-type actuator in FIG. 8A.

Next, a description will be given of a fifth embodiment of the present invention. FIG. 8A is a perspective view schematically showing an arrangement of a vibration-type actuator 50 according to the fifth embodiment of the present invention. FIG. 8B is a side view showing the vibration-type actuator 50 (as seen in the X direction). The vibration-type actuator 50 has a vibrating body 57 and a driven body 58. The vibrating body 57 has an elastic body 51 and a piezoelectric element 52, and the driven body 58 has a driven base material 53 and a permanent magnet 54. The permanent magnet 54 is the same as the permanent magnet 14 of the first embodiment described above. Magnetic characteristics and mechanical characteristics required for the elastic body 51 and the driven base material 53 are the same as those required for the elastic body 11 and the driven base material 13 of the first embodiment described above, and hence description thereof is omitted here.

The elastic body 51 has a flat-shaped portion 51a, and one projecting portion 51b formed at one of ends in the Y direction (ends in the width direction) of the flat-shaped portion 51a. The driven base material 53 has a magnet joining portion 53a, a sliding portion 53b extending in one of the Y directions from the magnet joining portion 53a, and an extending portion 53c extending in the other one of the Y directions from the magnet joining portion 53a and then extending toward the vibrating body 57 in a state of being mounted on the vibrating body 57.

In the vibration-type actuator 50 as well, a magnetic action of the permanent magnet 54 generates a desired pressurizing force between the driven base material 53 and the elastic body 51 to bring the sliding portion 53b and the projecting portion 51b into pressure contact with each other. At this time, particularly in the vibration-type actuator 50, a strong attracting force is generated between the flat-shaped portion 51a and the extending portion 53c, and this attracting force acts as a pressurizing force on the projecting portion 51b and the sliding portion 53b. On this occasion, the vibrating body 57 and the driven body 58 are placed such that the flat-shaped portion 51a and the extending portion 53c keep a predetermined gap without being in contact with each other. For this layout, the vibrating body 57 and the driven body 58 are supported by respective independent supporting members, not shown, so as to be at least inhibited from rotating about an X-axis. The effects obtained by the vibration-type actuator 10 are obtained by the vibration-type actuator 50 as well.

Figure 9A:
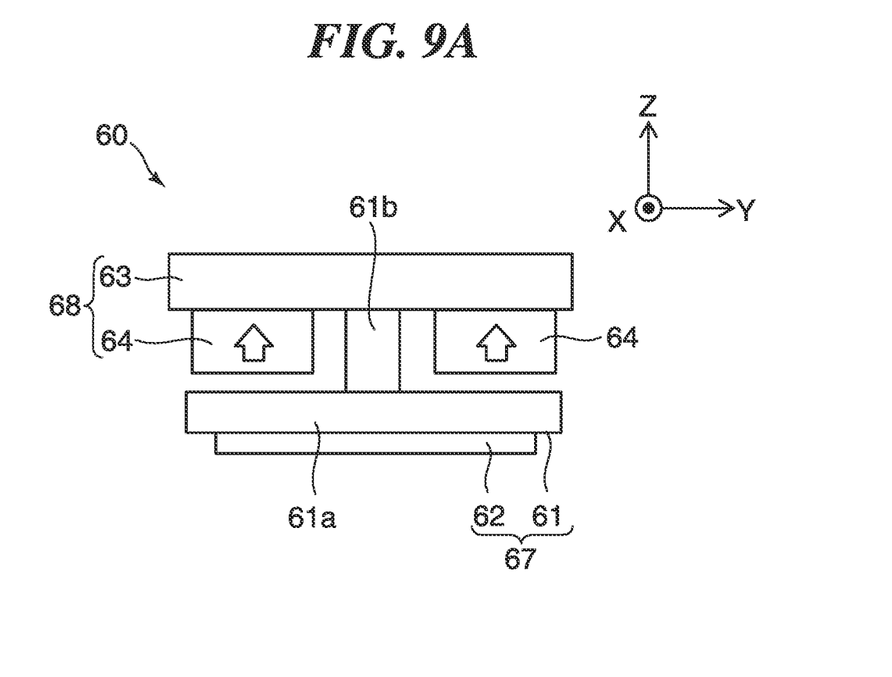
FIG. 9A is a perspective view schematically showing an arrangement of a vibration-type actuator according to a sixth embodiment of the present invention.
Figure 9B:
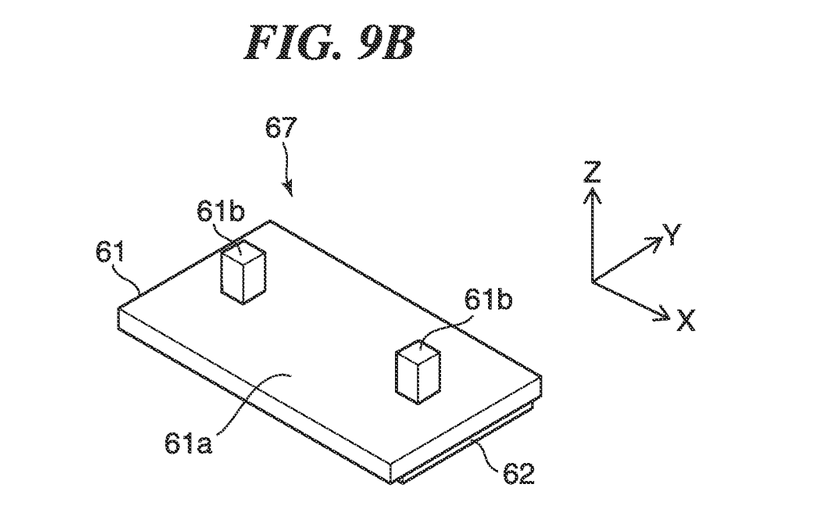
FIG. 9B is a side view showing the vibrating body constituting the vibration-type actuator in FIG. 9A.

Next, a description will be given of a sixth embodiment of the present invention. FIG. 9A is a side view schematically showing an arrangement of a vibration-type actuator 60 according to the sixth embodiment of the present invention (as seen in the X direction). FIG. 9B is a perspective view showing an arrangement of a vibrating body 67 constituting the vibration-type actuator 60. The vibration-type actuator 60 has the vibrating body 67 and a driven body 68. The vibrating body 67 has an elastic body 61 and a piezoelectric element 62. The driven body 68 has a driven base material 63 and two permanent magnets 64. Each of the two permanent magnets 64 is the same as the permanent magnet 14 of the first embodiment described above, and the driven base material 63 is the same as the driven base material 23 of the first embodiment described above. Magnetic characteristics and mechanical characteristics required for the driven base material 63 are the same as those required for the elastic body 11 and the driven base material 13 of the first embodiment described above, and hence description thereof is omitted here.

The elastic body 61 has a flat-shaped portion 61a and two projecting portions 61b which are provided in a central part of the flat-shaped portion 61a in the Y direction with a predetermined space left therebetween in the X direction. The vibrating body 67 has a substantially symmetrical shape in each of the X direction and the Y direction. In the vibrating body 67, by applying a predetermined AC voltage to the piezoelectric element 62, a vibration in a primary out-of-plane bending vibration mode in which the projecting portions 61b are caused to reciprocate in the Z direction and a secondary out-of-plane bending vibration mode in which the projecting portions 61b are caused to reciprocate in the X direction are excited with a predetermined phase difference. This generates an oval motion of the projecting portions 61b within a substantially ZX plane to move the vibrating body 57 and the driven body 58 relatively to each other in the X direction.

The vibration-type actuator 60 is configured such that the two projecting portions 61b are in contact with substantially a central part of the driven base material 63 in the Y direction, and the two projecting portions 61b are located in substantially midway between the two permanent magnets 64 in the Y direction. As a result, a magnetic action of the permanent magnet 64 generates a desired pressurizing force between the flat-shaped portion 61a of the elastic body 61 and the driven base material 63 to bring the driven base material 63 and the two projecting portion 61b into pressure contact with each other. At this time, a strong pressurizing force is generated between the flat-shaped portion 61a and the driven base material 63 since the vibration-type actuator 60 has the two permanent magnets 64. It should be noted that the height of the projecting portions 61b and the thickness of the permanent magnets 64 are customized according to desired characteristics. The effects obtained by the vibration-type actuator 10 are obtained by the vibration-type actuator 60 as well.

Figure 10A:
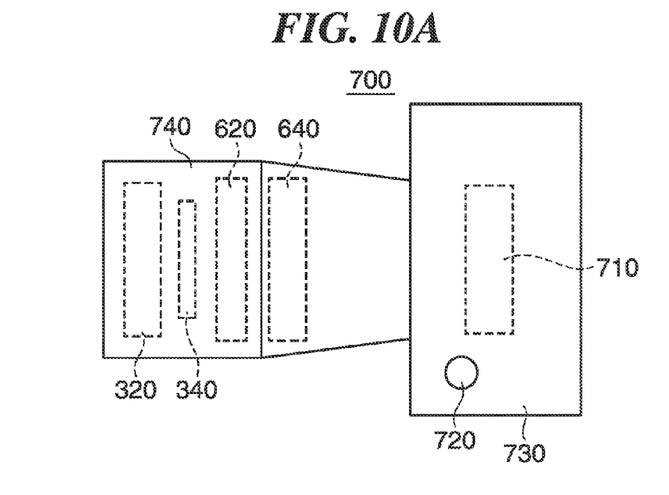
FIG. 10A is a top view schematically showing an arrangement of an image pickup apparatus for which the vibration-type actuator in FIGS. 1A and 1B is used.

Next, a description will be given of a seventh embodiment of the present invention. In the following description of the seventh embodiment, an image pickup apparatus which is an exemplary electronic apparatus having the vibrating body 17 of the first embodiment described above will be described. FIG. 10A is a top view schematically showing an arrangement of the image pickup apparatus 700. The image pickup apparatus 700 has a camera main body 730 equipped with an image pickup device 710 and a power button 720. The image pickup apparatus 700 also has a lens barrel 740 that has a first lens group 310 (FIG. 10B), a second lens group 320, a first lens group 330 (FIG. 10B), a fourth lens group 340, and vibration-type drive units 620 and 640. The lens barrel 740 is replaceable as an interchangeable lens, and the lens barrel 740 suitable for an object of shooting is allowed to be mounted on the camera main body 730. In the image pickup apparatus 700, the two vibration-type drive units 620 and 640 drive the second lens group 320 and the fourth lens group 340, respectively.

Although an arrangement of the vibration-type drive unit 620 is not shown in detail, the vibration-type drive unit 620 has the vibrating body 17 of the first embodiment described above, an annular driven body, and a drive circuit that applies drive signals to the piezoelectric element 12 of the vibrating body 17. The driven body is disposed inside the lens barrel 740 such that its radial direction is substantially perpendicular to an optical axis. The driven body has an annular driven base material and an annular permanent magnet. The permanent magnet is joined to a substantially central part of the driven base material using an adhesive agent such that the permanent magnet is concentric with the driven base material. The driven base material has a sliding surface that is substantially perpendicular to the optical axis when it is placed inside the lens barrel 740. The sliding surface of the driven base material is comprised of an annular region on an inner-diameter side and an annular region on an outer-diameter side, which sandwich the permanent magnet, on a surface of the driven base material to which the permanent magnet is joined. For example, the three vibrating bodies 17 are fixed to an annular base at regular intervals on a circumference around the optical axis so that their respective projecting portions 11*b* can be brought into pressure contact with the sliding surface of the driven base material to apply frictional driving force (thrust) to the driven base material in a tangent to a circle around the optical axis. It should be noted that pressurizing force for bringing the projecting portions 11*b* and the sliding surface of the driven base material in the direction of the optical axis is obtained by a magnetic action of the permanent magnet. How to drive the vibrating bodies has already been described, and hence description thereof is omitted here. With the arrangement described above, the vibration-type drive unit 620 moves the second lens group 320 in the direction of the optical axis by rotating the driven body about the optical axis and converting rotation output from the driven body to a straight-ahead motion in the direction of the optical axis through a gear or the like, not shown. The vibration-type drive unit 640 has the same arrangement as that of the vibration-type drive unit 620 to move the fourth lens group 340 in the direction of the optical axis.

Figure 10B:
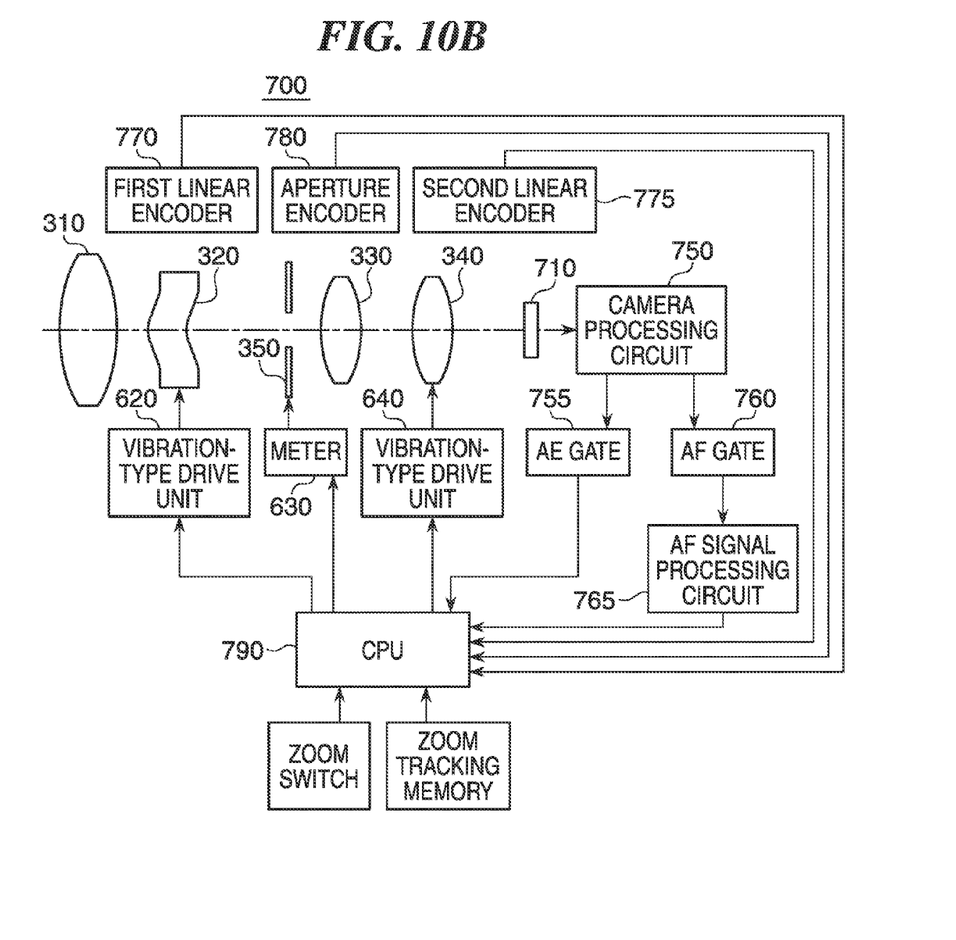
FIG. 10B is a block diagram schematically showing an arrangement of the image pickup apparatus in FIG. 10A.

FIG. 10B is a block diagram schematically showing an arrangement of the image pickup apparatus 700. The first lens group 310, the second lens group 320, the third lens group 330, the fourth lens group 340, and a light amount adjustment unit 350 are placed at predetermined locations on the optical axis inside the lens barrel 740. Light that has passed through the first lens group 310 to the fourth lens group 340 and the light amount adjustment unit 350 forms an image on the image pickup device 710. The image pickup device 710 converts an optical image into an electric signal and outputs the electric signal, which in turn is sent to a camera processing circuit 750.

The camera processing circuit 750 subjects an output signal from the image pickup device 710 to amplification, gamma correction, and so forth. The camera processing circuit 750 is connected to a CPU 790 via an AE gate 755 and is connected to the CPU 790 via an AF gate 760 and an AF signal processing circuit 765. A picture signal subjected to predetermined processing by the camera processing circuit 750 is sent to the CPU 790 through the AE gate 755, the AF gate 760, and the AF signal processing circuit 765. It should be noted that the AF signal processing circuit 765 extracts high-frequency components from the picture signal to generate an evaluation value signal for auto focusing (AF) and supplies the generated evaluation value to the CPU 790.

The CPU 790 is a control circuit that controls the overall operation of the image pickup apparatus 700 and generates control signals, which are for use in determining exposure and focusing, from obtained picture signals. The CPU 790 adjusts the positions of the second lens group 320, the fourth lens group 340, and the light amount adjustment unit 350 in the direction of the optical axis by controlling the operation of the vibration-type drive units 620 and 640 and a meter 630 so that a determined exposure and an appropriate focusing state can be obtained. Under the control of the CPU 790, the vibration-type drive unit 620 moves the second lens group 320 in the direction of the optical axis, the vibration-type drive unit 640 moves the fourth lens group 340 in the direction of the optical axis, and the light amount adjustment unit 350 is drivingly controlled by the meter 630.

The position of the second lens group 320, which is driven by the vibration-type drive unit 620, in the direction of the optical axis is detected by a first linear encoder 770, and the CPU 790 is notified of the detection result, which in turn is fed back to the operation of the vibration-type drive unit 620. Likewise, the position of the fourth lens group 340, which is driven by the vibration-type drive unit 640, in the direction of the optical axis is detected by a second linear encoder 775, and the CPU 790 is notified of the detection result, which in turn is fed back to the operation of the vibration-type drive unit 640. The position of the light amount adjustment unit 350 in the direction of the optical axis is detected by an aperture encoder 780, and the CPU 790 is notified of the detection result, which in turn is fed back to the operation of the meter 630.

When a vibration-type actuator is used for the purpose of moving a predetermined lens group of the image pickup apparatus 700 in the direction of the optical axis, great holding force is maintained even when the lens group is at a standstill. As a result, the lens group is prevented from being displaced even when external force acts on the lens barrel and the main body of the image pickup apparatus.

The example in which a lens group is moved in the direction of the optical axis using the vibration-type drive units 620 and 640 having an annular driven body has been described, but an arrangement for moving a lens group in the direction of the optical axis using a vibration-type actuator (vibrating body) is not limited to this. For example, the vibrating body 17 may linearly drive the driven body 18. Thus, by mounting a holding member, which is holding a lens, on a driven body such that the direction of the optical axis of the lens and the direction in which the driven body is driven are substantially parallel, a lens group is moved in the direction of the optical axis and positioned. Also, when an image stabilization lens is incorporated in a lens barrel, the vibrating body 17 is used for an image stabilization unit that moves the image stabilization lens in an arbitrary direction within a plane substantially perpendicular to the optical axis. In this case, one or more vibrating bodies 17 which drive the lens holding member should be placed so as to move the lens holding member in two directions perpendicular to each other within the plane substantially perpendicular to the optical axis. The image stabilization unit should not necessarily be configured to drive the image stabilization lens but may be configured to move the image pickup device 710, which is incorporated in the main body of the image pickup apparatus, in an arbitrary direction within the plane perpendicular to the optical axis.

It should be noted that in the above description, the image pickup apparatus 700 is taken as an example of an electronic apparatus using the vibration-type actuator 10, but the vibration-type actuator 10 may be applied to other electronic apparatuses. For example, the vibration-type actuator 10 may be used as an X-Y stage driving source. The image pickup apparatus 700 is configured such that rotational driving force is obtained using the vibration-type actuator 10. Rotational driving force thus obtained using the vibration-type actuator 10 may be applied to drive, for example, a photosensitive drum of an image forming apparatus or rotatively drive an arm of a jointed-arm robot.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-005289, filed Jan. 14, 2016, which is hereby incorporated by reference herein in its entirety.

What is claimed is:

1. A vibration-type actuator that brings a vibrating body and a contact body into press contact with each other and relatively moves the vibrating body and the contact body through driving vibrations excited in the vibrating body,
    wherein the vibrating body comprises:
        a flat-shaped elastic body that is made of a ferromagnetic material;
        an electro-mechanical energy conversion element that is joined to one surface of the elastic body; and
        at least one projecting portion that is provided on a surface opposite to the surface of the elastic body to which the electro-mechanical energy conversion element is joined,
    wherein the contact body comprises:
        a contact base material that is made of a ferromagnetic material and is brought into press contact with the vibrating body at an end of the at least one projecting portion; and
        a permanent magnet that is joined to the contact base material,
    wherein the contact base material and the elastic body are placed so as to face each other,
    wherein the permanent magnet is disposed between the contact base material and the elastic body,
    wherein the permanent magnet is magnetized in a direction perpendicular to a moving direction in which the vibrating body and the contact body move relatively to each other, and
    wherein a magnetic action of the permanent magnet on the elastic body and the contact base material brings the projecting portion and the contact base material into press contact with each other in the direction perpendicular to the moving direction.

2. The vibration-type actuator according to claim 1, wherein the contact base material comprises a magnet joining portion to which the permanent magnet is joined, and a sliding portion that comes into contact with the projecting portion, and the magnet joining portion and the sliding portion are formed integrally with each other such that the sliding portion is closer to the elastic body than the magnet joining portion is to the elastic body.

3. The vibration-type actuator according to claim 1, wherein one or more projecting portions are provided at an end of the elastic body in a direction perpendicular to both of a pressurizing pressing direction in which the vibrating body and the contact body are brought into press contact with each other and the moving direction.

4. The vibration-type actuator according to claim 1, wherein side wall portions that project toward the contact body are provided at an end of the elastic body in a direction perpendicular to both of a pressing direction in which the vibrating body and the contact body are brought into press contact with each other and the moving direction, and
    one of the projecting portions is provided on an end face of each of the side wall portions.

5. The vibration-type actuator according to claim 1, wherein the projecting portion is provided on the elastic body at one end in a direction perpendicular to both of a pressing direction in which the vibrating body and the contact body are brought into press contact with each other and the moving direction, and
    at the other end in the direction perpendicular to both of the pressing and moving directions, an extending portion that extends toward the vibrating body is provided on the contact base material with a predetermined space left between the extending portion and the elastic body.

6. The vibration-type actuator according to claim 1, wherein the projecting portion is provided in substantially a central part of the elastic body in a direction perpendicular to both of a pressing direction in which the vibrating body and the contact body are brought into press contact with each other and the moving direction, and
    two permanent magnets are joined to the contact base material so as to face each other across the projecting portion in the direction perpendicular to both of the pressing and moving directions.

7. The vibration-type actuator according to claim 1, wherein the elastic body and the contact body have a substantially symmetrical shape with respect to a direction perpendicular to both of a pressing direction in which the vibrating body and the contact body are brought into press contact with each other and the moving direction.

8. The vibration-type actuator according to claim 1, wherein the contact base material and the elastic body are placed so as to face each other in the direction perpendicular to the moving direction.

9. The vibration-type actuator according to claim 1, wherein projecting portions are provided at both ends of the elastic body, respectively, in a direction perpendicular to both of a pressing direction in which the vibrating body and the contact body are brought into press contact with each other and the moving direction, and
    wherein the permanent magnet is placed between the projecting portions.

10. The vibration-type actuator according to claim 1, wherein the permanent magnet is surrounded by the contact base material, the elastic body and the at least one projecting portion.

11. An electronic apparatus comprising:
    a vibration-type actuator that brings a vibrating body and a contact body into press contact with each other and relatively moves the vibrating body and the contact body through driving vibrations excited in the vibrating body; and
    a member that is joined to the contact body of the vibration-type actuator and a part of the contact body which is driven to move by the vibration-type actuator, and moved to be positioned at a predetermined place location through operation of the vibration-type actuator, wherein the vibrating body comprises a flat-shaped elastic body that is made of a ferromagnetic material, an electro-mechanical energy conversion element that is joined to one surface of the elastic body, and at least one projecting portion that is provided on a surface opposite to the surface of the elastic body to which the electro-mechanical energy conversion element is joined, wherein the contact body comprises a contact base material that is made of a ferromagnetic material and is brought into press contact with the vibrating body at an end of the at least one projecting portion, and a permanent magnet that is joined to the contact base material, wherein the contact base material and the elastic body are placed so as to face each other, wherein the permanent magnet is disposed between the contact base material and the elastic body, wherein the permanent magnet is magnetized in a direction perpendicular to a moving direction in which the vibrating body and the contact body move relatively to each other, and wherein a magnetic action of the permanent magnet on the elastic body and the contact base material brings the projecting portion and the contact base material into press contact with each other in the direction perpendicular to the moving direction.

12. A vibration-type actuator that brings a vibrating body and a contact body into press contact with each other and relatively moves the vibrating body and the contact body through driving vibrations excited in the vibrating body,
wherein the vibrating body comprises:
an elastic body that is made of a ferromagnetic material;
an electro-mechanical energy conversion element that is joined to one surface of the elastic body; and
at least one projecting portion that is provided on a surface opposite to the surface of the elastic body to which the electro-mechanical energy conversion element is joined,
wherein the contact body comprises:
a contact base material that is made of a ferromagnetic material and is brought into press contact with the vibrating body at an end of the at least one projecting portion; and
a permanent magnet that is joined to the contact base material,
wherein the contact base material and the elastic body are placed so as to face each other,
wherein the permanent magnet is disposed between the contact base material and the elastic body, and
wherein a magnetic action of the permanent magnet on the elastic body and the contact base material brings the projecting portion and the contact base material into press contact with each other.

13. The vibration-type actuator according to claim 12, wherein the contact base material and the elastic body are placed so as to face each other and interpose the permanent magnet therebetween in a thickness direction of the elastic body,
wherein the permanent magnet is magnetized in the thickness direction of the elastic body, and
wherein the magnetic action of the permanent magnet on the elastic body and the contact base material brings the projecting portion and the contact base material into press contact with each other in the thickness direction of the elastic body.

14. The vibration-type actuator according to claim 12, wherein the contact base material comprises a magnet joining portion to which the permanent magnet is joined, and a sliding portion that comes into contact with the projecting portion, and the magnet joining portion and the sliding portion are formed integrally with each other such that the sliding portion is closer to the elastic body than the magnet joining portion is to the elastic body.

15. The vibration-type actuator according to claim 12, wherein one or more projecting portions are provided at an end of the elastic body in a direction perpendicular to both of a pressing direction in which the vibrating body and the contact body are brought into press contact with each other and the moving direction.

16. The vibration-type actuator according to claim 12, wherein side wall portions that project toward the contact body are provided at an end of the elastic body in a direction perpendicular to both of a pressing direction in which the vibrating body and the contact body are brought into press contact with each other and the moving direction, and
one of the projecting portions is provided on an end face of each of the side wall portions.

17. The vibration-type actuator according to claim 12, wherein the projecting portion is provided on the elastic body at one end in a direction perpendicular to both of a pressing direction in which the vibrating body and the contact body are brought into press contact with each other and the moving direction, and
at the other end in the direction perpendicular to both of the pressing and moving directions, an extending portion that extends toward the vibrating body is provided on the contact base material with a predetermined space left between the extending portion and the elastic body.

18. The vibration-type actuator according to claim 12, wherein the projecting portion is provided in substantially a central part of the elastic body in a direction perpendicular to both of a pressing direction in which the vibrating body and the contact body are brought into press contact with each other and the moving direction, and
two permanent magnets are joined to the contact base material so as to face each other across the projecting portion in the direction perpendicular to both of the pressing and moving directions.

19. The vibration-type actuator according to claim 12, wherein the elastic body and the contact body have a substantially symmetrical shape with respect to a direction perpendicular to both of a pressing direction in which the vibrating body and the contact body are brought into press contact with each other and the moving direction.

20. The vibration-type actuator according to claim 12, wherein the contact base material and the elastic body are placed so as to face each other in a thickness direction of the elastic body.

21. The vibration-type actuator according to claim 12, wherein projecting portions are provided at both ends of the elastic body, respectively, in a direction perpendicular to both of a pressing direction in which the vibrating body and the contact body are brought into press contact with each other and the moving direction, and
wherein the permanent magnet is placed between the projecting portions.

22. The vibration-type actuator according to claim 12, wherein the permanent magnet is surrounded by the contact base material, the elastic body and the at least one projecting portion.

23. An electronic apparatus comprising:
a vibration-type actuator that brings a vibrating body and a contact body into press contact with each other and relatively moves the vibrating body and the contact body through driving vibrations excited in the vibrating body; and
a member connected to a portion among the vibrating body and the contact body both constituting the vibration-type actuator, the portion being driven through driving of the vibration-type actuator,
wherein the member is moved to and positioned at a predetermined position through driving of the vibration-type actuator,
wherein the vibrating body comprises an elastic body that is made of a ferromagnetic material, an electro-mechanical energy conversion element that is joined to one surface of the elastic body, and at least one projecting portion that is provided on a surface opposite to the surface of the elastic body to which the electro-mechanical energy conversion element is joined,
wherein the contact body comprises a contact base material that is made of a ferromagnetic material and is brought into press contact with the vibrating body at an end of the at least one projecting portion, and a permanent magnet that is joined to the contact base material,
wherein the contact base material and the elastic body are placed so as to face each other,
wherein the permanent magnet is disposed between the contact base material and the elastic body, and
wherein a magnetic action of the permanent magnet on the elastic body and the contact base material brings the projecting portion and the contact base material into press contact with each other.

24. The electronic apparatus according to claim 23, wherein the contact base material and the elastic body are placed so as to face each other and interpose the permanent magnet therebetween in a thickness direction of the elastic body,
wherein the permanent magnet is magnetized in the thickness direction of the elastic body, and
wherein the magnetic action of the permanent magnet on the elastic body and the contact base material brings the projecting portion and the contact base material into press contact with each other in the thickness direction of the elastic body.

* * * * *